US008493183B2

(12) United States Patent
Yamagajp et al.

(10) Patent No.: US 8,493,183 B2
(45) Date of Patent: Jul. 23, 2013

(54) WIRELESS TAG AND METHOD FOR PRODUCING WIRELESS TAG

(75) Inventors: Takashi Yamagajp, Kawasaki (JP); Toru Maniwa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 876 days.

(21) Appl. No.: 12/648,675

(22) Filed: Dec. 29, 2009

(65) Prior Publication Data

US 2010/0097191 A1 Apr. 22, 2010

Related U.S. Application Data

(63) Continuation of application No. PCT/JP2007/064138, filed on Jul. 18, 2007.

(51) Int. Cl.

| | |
|---|---|
| ***H04Q 5/22*** | (2006.01) |
| ***G08B 13/14*** | (2006.01) |
| ***G08B 23/00*** | (2006.01) |
| ***G08B 21/00*** | (2006.01) |
| ***H01Q 1/00*** | (2006.01) |
| ***H01Q 7/00*** | (2006.01) |
| ***H01Q 11/02*** | (2006.01) |
| ***H01Q 3/00*** | (2006.01) |
| ***H01Q 7/04*** | (2006.01) |
| ***G06K 19/06*** | (2006.01) |

(52) U.S. Cl.
USPC .................... 340/10.1; 340/572.7; 340/573.1; 340/651; 343/730; 343/866; 343/803; 343/732; 343/748; 343/764; 343/842; 235/492

(58) Field of Classification Search
USPC .............. 340/10.1, 572.1, 572.7, 572.8, 10.2, 340/572.5, 505, 568, 572; 343/764, 866, 343/730, 803, 846, 725, 741, 728, 732, 853, 343/855; 235/375, 385, 435, 492; 455/562.1, 455/575.7, 83, 562
See application file for complete search history.

(56) References Cited

U.S. PATENT DOCUMENTS

| | | | | |
|---|---|---|---|---|
| 6,335,686 | B1 | 1/2002 | Goff et al. | |
| 7,154,449 | B2 * | 12/2006 | Liu et al. | 343/867 |
| 7,545,328 | B2 * | 6/2009 | Son et al. | 343/700 MS |
| 7,762,472 | B2 * | 7/2010 | Kato | 235/492 |
| 2002/0011967 | A1 | 1/2002 | Goff et al. | |
| 2003/0206107 | A1 | 11/2003 | Goff et al. | |

(Continued)

FOREIGN PATENT DOCUMENTS

| | | |
|---|---|---|
| CN | 1312928 A | 9/2001 |
| CN | 1835283 A | 9/2006 |

(Continued)

OTHER PUBLICATIONS

European Office Action dated Dec. 2, 2010 in application No. 07790893.7.

(Continued)

*Primary Examiner* — Jennifer Mehmood
*Assistant Examiner* — Mirza Alam
(74) *Attorney, Agent, or Firm* — Smith, Gambrell & Russell, LLP

(57) ABSTRACT

The wireless tag includes an antenna conductor; a first power-supply conductor which is electromagnetic-inductively coupled with the antenna conductor; and a second power-supply conductor which is loop-shaped and which is electrically coupled with the first power-supply conductor.

10 Claims, 16 Drawing Sheets

U.S. PATENT DOCUMENTS

| | | | | |
|---|---|---|---|---|
| 2004/0108957 | A1 | 6/2004 | Umehara et al. | |
| 2005/0093677 | A1 * | 5/2005 | Forster et al. | 340/10.1 |
| 2005/0153755 | A1 | 7/2005 | Suzuki et al. | |
| 2006/0061515 | A1 * | 3/2006 | Posluszny et al. | 343/803 |
| 2006/0208955 | A1 | 9/2006 | Kai et al. | |
| 2006/0293014 | A1 * | 12/2006 | Forster | 455/274 |
| 2007/0040028 | A1 | 2/2007 | Kawamata | |
| 2007/0052613 | A1 | 3/2007 | Gallschuetz et al. | |
| 2007/0268194 | A1 | 11/2007 | Kai et al. | |
| 2008/0012773 | A1 * | 1/2008 | Andrenko et al. | 343/700 R |
| 2009/0224056 | A1 * | 9/2009 | Kwon | 235/492 |
| 2009/0322634 | A1 * | 12/2009 | Yun et al. | 343/741 |
| 2010/0283694 | A1 * | 11/2010 | Kato | 343/730 |

FOREIGN PATENT DOCUMENTS

| | | |
|---|---|---|
| JP | 2000077928 | 3/2000 |
| JP | 2002522999 | 7/2002 |
| JP | 2004201278 | 7/2004 |
| JP | 2004295297 | 10/2004 |
| JP | 2005203877 | 7/2005 |
| JP | 2006033298 | 2/2006 |
| JP | 2006217511 | 8/2006 |
| JP | 2006295879 | 10/2006 |
| KR | 10-2006-0064454 | 6/2006 |
| WO | 0010112 | 2/2000 |
| WO | 2007020728 | 2/2007 |

OTHER PUBLICATIONS

Krischke A ED—Rothammel K: "Rothammels's Antennenbuch passage", Jan. 1, 2001, Rothammels Antennenbuch, Darc Verlag, Baunatal, pp. 129-130, XP002455790, ISBN: 978-3-88692-033-4 *paragraph [6.2.5]; figure 6.2.9*.

Korean Intellectual Property Office Notice of Preliminary Rejection dated Mar. 31, 2011 received in corresponding Korean Patent Application No. 10-2010-7000973.

State Intellectual Property Office of China First Notification of Office Action dated Apr. 26, 2012 received in Patent Application No. 200780053803.1.

International Search Report based on International application No. PCT/JP2007/064138 dated Oct. 23, 2007.

H.W. Son, et al."Design of RFID Tag Antennas Using An Inductively Coupled Feed" Electronics Letters vol. 41 No. 18 dated Sep. 1, 2005.

* cited by examiner

WIRELESS TAG AND METHOD FOR PRODUCING WIRELESS TAG

CROSS-REFERENCE TO RELATED APPLICATION

This application is a continuation Application of a PCT international application No. PCT/JP2007/064138 filed on Jul. 18, 2007 in Japan, the entire contents of which are incorporated by reference.

FIELD

The embodiments discussed herein are related to a wireless tag and a method for producing a wireless tag.

BACKGROUND

As one of the wireless communication systems, the RFID (Radio Frequency Identification) system has been known. The RFID system generally includes wireless tag (also called RFID tag) and reader/writer (RW) units, in which RW units read and write data from and into wireless tags through wireless communication.

Known wireless tags are classified into a type (called an active tag) which operates through the use of the power source incorporated in the wireless tag itself and a type (called a passive tag) which operates through the use of radio wave received from RW units as driving power.

In a RFID system using passive tags, wireless tags operate the integrated circuits, such as ICs or LSIs, incorporated therein through the use of the radio signals received from RW units as driving power, and thereby carry out various processes in accordance with received radio signals (control signals). Transmission from wireless tags to RW units uses reflected wave of the received radio signal. In other words, a tag ID and results of the various processes are superimposed on the reflected wave, which is transmitted to the RW units.

RFID systems have used various frequency bandwidths. Recently, more attention has been paid to the UHF bandwidth (860 MHz through 960 MHz), which is capable of long-distance communication as compared to the 13.56-MHz and 2.45-GHz which have been put into practice. In the country of Japan, the bandwidth from 952 MHz through 954 MHz has been allocated to RFID systems.

A conventional technique related to an antenna used for wireless tags is disclosed in the Patent References 1 to 3 and a Non-Patent Reference 1 listed below.

Patent Reference 1 aims at providing a loop antenna having the enhanced antenna ability and discloses possession of a loop antenna main body which is formed of a line- or band-shaped conductive material having a form of a loop shape and which has a pair of power-supply points and a material (a parasitic element) for improving the antenna ability which material satisfies predetermined conditions.

Patent Reference 2 aims at providing a wireless tag having a configuration that enables communication at a number of frequency bandwidths, and discloses a first conductor, which has a length of about ½ wavelength and a form of a loop with opposite sides substantially parallel to each other and which is supplied with power at the center of one side of the loop, and a line-shaped second conductor disposed in vicinity of the first conductor.

Patent Reference 3 aims at providing a ring antenna with a parasitic element which antenna has improved narrow-bandwidth characteristics and an improved gain, and discloses possession of at least one basic ring antenna element and parasitic element formed of a first conductor and a second conductor which sandwich the basic ring antenna element and which are arranged in the electric-field direction of the basic ring antenna. Patent Reference 3 also discloses that the relationship $0.3\times\lambda o \leqq La \leqq 0.55\times\lambda o$ is satisfied where the symbol La represents the length between the outer ends of the first conductor and the second conductor and the free space wavelength of the using frequency fo of the at least one basic ring antenna.

Non-Patent Reference 1 discloses a wireless tag antenna including a line-shaped (band-shaped) radiating body and a loop-shaped power-supply element (feed loop) which is arranged in the width direction of the radiating body at a distance d and which is inductively coupled to the radiating body.

Patent Reference 1: Japanese Patent Publication No. 2000-77928

Patent Reference 2: Japanese Patent Publication No. 2004-295297

Patent Reference 3: Japanese Patent Publication No. 2006-33298

Non-Patent Reference 1: H.-W. Son and C.-S. Pyo, “Design of RFID tag antennas using an inductively coupled feed”, Electronics Letters, Vol. 41, No. 18, 1, September 2005

Characteristics of matching (matching loss) between an antenna (hereinafter called a “tag antenna”) of a wireless tag and an integrated circuit such as an IC or an LSI is an important factor which determines the capacity (communication range) of the wireless tag.

The impedance (Z=R+jX) of the integrated circuit used in the wireless tag has, for example, a real part (resistance component R) of approximately dozens ohm (Ω) and imaginary part (reactance component jX) of approximately −j hundreds ohm. The tag antenna should match the impedance, that is, should establish a relationship of complex conjugate between the impedance of the tag antenna and the impedance of the integrated circuit.

A wireless tag has a matching state easily affected by an article (metal, plastic, paper, and others) to which the tag is to be affixed to or an article positioning in vicinity of the tag (i.e., easily vary the communication range and in some occasions, communication is disabled).

For this reason, there has been arisen a demand for a configuration of a wireless tag whose matching can be easily adjusted.

However, the techniques disclosed in Patent References 1 to 3 have a configuration in which an integrated circuit is directly coupled with a power-supply section of a loop-shaped antenna (hereinafter also called an “antenna pattern” and a “loop antenna”), in other words, a configuration in which the antenna pattern and the power-supply section are formed into one body. Such a configuration has an extreme difficulty in attaining (adjusting) impedance matching between the antenna pattern and the chip circuit. In particular, it is extremely difficult to control (adjust) the resistance component (R) and the reactance component (X) of the impedance (Z) independently from each other (in other words, to make it possible to attain matching with any integrated circuit having different R and/or X).

In Patent References 1 and 3, the parasitic element arranged in vicinity of the antenna pattern aims at improvement in antenna gain and at stabilization of the frequency properties of the scattering cross section, but not at impedance adjustment. In the meantime, the parasitic element (the second conductor) arranged in vicinity of the antenna pattern in Patent Reference 2 is surely for impedance adjustment, but is incapable of adjusting the resistance component (R) and the reactance component (X) independently from each other (the reference does not teach or suggest the adjustment).

On the other hand, Non-Patent Reference 1 discloses a wireless tag capable of modifying the resistance component (R) and the reactance component (X) independently from each other. In other words, according to formula (5a) of Non-Patent Reference 1, the resistance component R can be varied depending on the distance d (mutual inductance M) between a line-shaped radiating body and the loop-shaped power-supply element while according to formula (5b), the reactance component X can be varied depending on the length ($L_{loop}$) of the loop-shaped power-supply element.

However, in order to vary the resistance component R in the technique of the Non-Patent Reference 1, it is required to modify at least the distance d, that is, to modify arranged positions of the radiating body and the loop-shaped power-supply element, which may increase the size of the wireless tag under some impedances of the integrated circuit. Therefore, it is difficult to make the wireless tag small.

To a wireless tag, a protection (reinforcement) material 400 is sometimes provided as illustrated in items (1) and (2) of FIG. 16 which material covers an integrated circuit 300 for protection of the integrated circuit 300 or for reinforcement of the wireless tag. If an antenna pattern 100 and a power-supply section, with which the integrated circuit 300 is coupled, are formed into one body, one or more positions (crossing points) are generated at which the edges (ends) of the protection material 400 traverse the antenna pattern 100, and folding load concentrates on these positions. Thereby, the antenna pattern is disconnected at these positions.

SUMMARY (1) According to an aspect of the embodiments, an apparatus includes a wireless tag including an antenna conductor; a first power-supply conductor which is electromagnetic-inductively coupled with the antenna conductor; and a second power-supply conductor which is loop-shaped and which is electrically coupled with the first power-supply conductor.

(2) According to an aspect of the embodiments, a method includes a method of the producing a wireless tag including forming an antenna conductor; forming a first power-supply conductor which is electromagnetic-inductively coupled with the antenna conductor; and forming a second power-supply conductor which is loop-shaped and which is electrically coupled with the first power-supply conductor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described with reference to the drawings. Note that the embodiments are not limited to the embodiments to be described below, but may be modified in various ways without departing from sprits and scope of the embodiments, as a matter of course.

[1] First Embodiment

Figure 1:
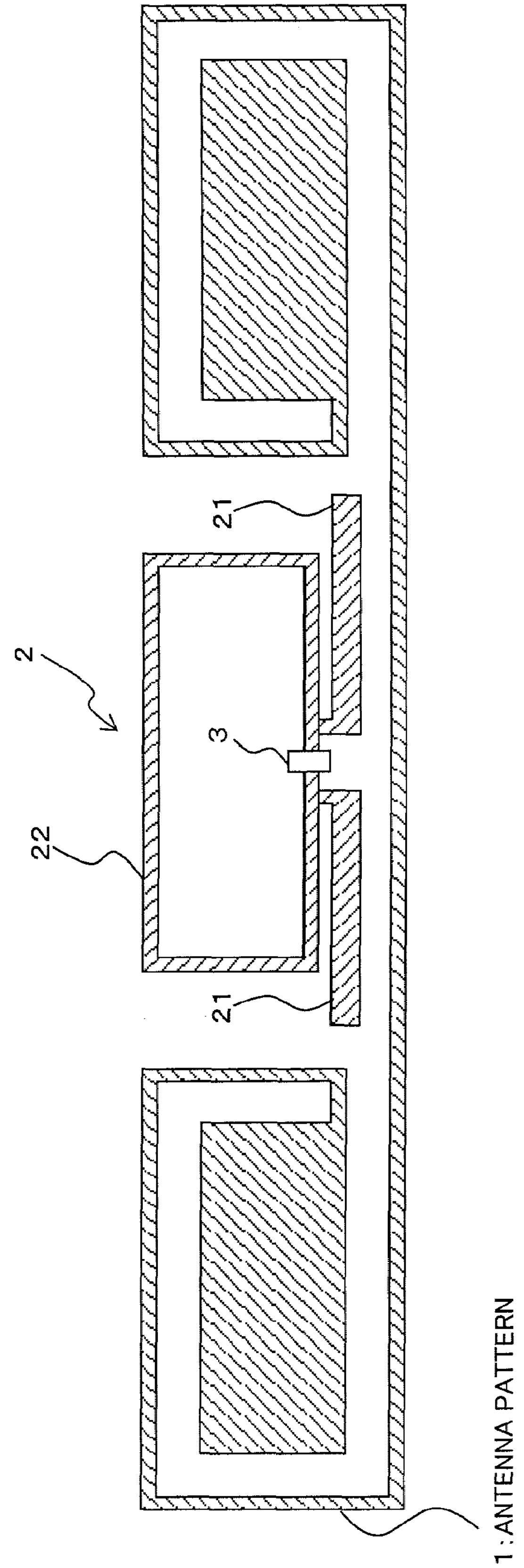
FIG. 1 is a plain view illustrating the configuration (conductive pattern) of a wireless tag according to a first embodiment.
Figure 3:
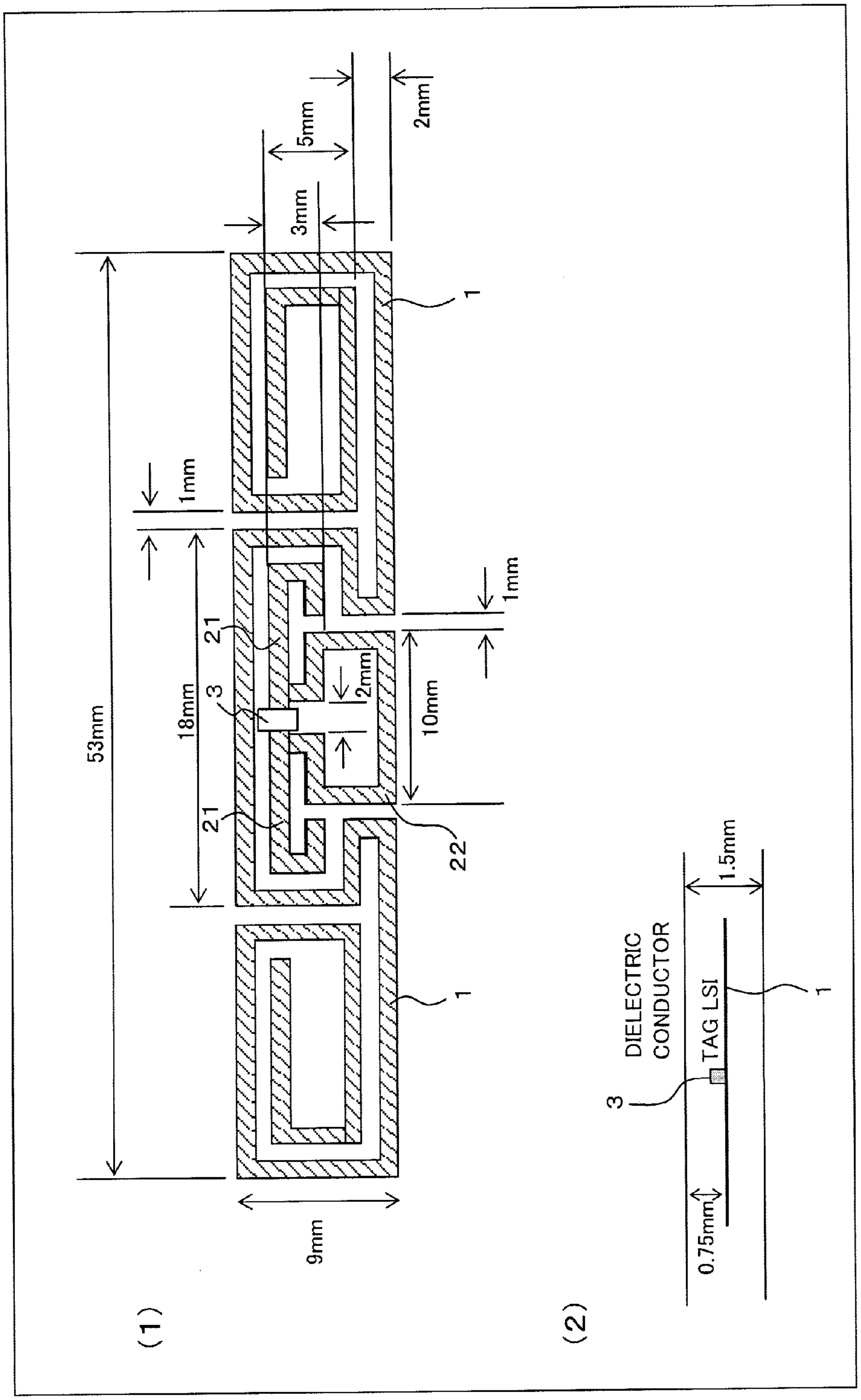
FIG. 3 is a diagram denoting conditions of simulation on the wireless tag of FIG. 2.

FIG. 1 is a plain view illustrating the configuration (conductor pattern) of a wireless tag according to the first embodiment. The wireless tag (hereinafter also called a tag antenna) of FIG. 1 includes a line-shaped (or band-shaped) antenna pattern (antenna conductor) 1 having both ends folded a number of times, a power-supply pattern (matching section) 2, disposed at a region surrounded by the folded portions and the remaining straight line portion of the antenna pattern 1, for impedance matching, and an integrated circuit (hereinafter also represented by a tag LSI 3) 3, such as an IC or an LSI, electrically coupled with the power-supply section of the power-supply pattern 2. The patterns 1 and 2 are disposed inside a dielectric material (layer), which is a compound of the wireless tag, as schematically illustrated in item (2) of FIG. 3.

The power-supply pattern hereinafter also called the matching pattern 2 functions as a power-supply section which supplies driving electricity based on the radio wave received by the antenna pattern 1 to the integrated circuit 3 or supplies electricity from a driving power source incorporated in the integrated circuit 3 to the antenna pattern 1, and includes two line-shape (or band-shape) patterns (line patterns, first power-supply conductors) 21 which high-frequency couple (electromagnetic-inductively couple) with the antenna pattern 1 and a loop (rectangle) pattern (a loop pattern; the second power-supply conductor) 22 which communicates with the line patterns 21 and which is electrically coupled with the line patterns 21.

The line patterns 21 are branches stretched out from points in proximity to the power-supply section (i.e., the integrated circuit 3) of the loop pattern 22 and extend in parallel with the straight line portion of the antenna pattern 1 in the opposite directions. Focusing on the shapes thereof, the line patterns 21 are formed to be left-light symmetric with the integrated circuit 3 to have a configuration identical to a so-called dipole antenna in the first embodiment. Therefore, the line patterns 21 are sometimes referred to as dipole sections 21 in the description below. However, one line pattern 21 may be provided which has the comparable shape as a monopole antenna.

It is preferable that the dimensions of the matching pattern 2 (the dipole sections 21 and the loop pattern 22), as a whole, are set so as not to contribute to transmission and reception of radio wave by the antenna pattern 1. For example, the total length of the loop pattern 22 is preferably set to be sufficiently shorter than the wavelength of the radio wave that is to be transmitted and received by the antenna pattern 1. The lengths of the dipole sections 21 which is electromagnetic-inductively coupled with the antenna pattern 1 are preferably set to be equal to or less than the half (half wavelength) of the wavelength of the radio wave that is to be transmitted and received by the antenna pattern 1.

Accordingly, the matching patterns 2 are different in purpose and function from an antenna element (radiating body) and an element (parasitic element) which is disposed in proximity of the antenna element in order to achieve a gain and adjust the matching (also different in the point that the matching pattern 2 is a "power-supply" pattern). Hereinafter, setting the lengths of the dipole sections 21 equal to or less than the half of the wavelength also aims at easing power supply (electromagnetic inductive coupling) to the antenna pattern 1 by causing electric current to flow through both dipole sections 21 in the same direction as will be detailed below.

In the wireless tag configured as the above, variation in length (electrical length) of the dipole sections 21 of the matching patterns 2 can vary mainly the resistance component (R) of the impedance (antenna impedance) of the tag antenna, that is, the real part (the conductance component G) of the admittance (Y=G+jB), which is the reciprocal of the impedance Z. Variation in loop length (electrical length) of the loop pattern 22 can mainly vary the reactance component (X) of the antenna impedance, that is, the imaginary part (the susceptance component B) of the admittance Y. These will be detailed below.

Since the antenna pattern 1 and the matching pattern 2 are physically isolated (independent) from each other, the dimensions of the power-supply pattern 2 and the antenna pattern 1 can be independently adjusted (controlled) with ease. For example, the size of the tag antenna can be easily varied without requiring processing such as soldering simply by replacing only the antenna pattern 1 remaining the power-supply pattern 2 or by replacing only the power-supply pattern 2 remaining the antenna pattern 1. As a result, that makes it possible to reuse the antenna pattern 1 and the matching pattern 2 in reusing the wireless tag or other occasions, greatly contributing to resource consumption saving.

Figure 2:
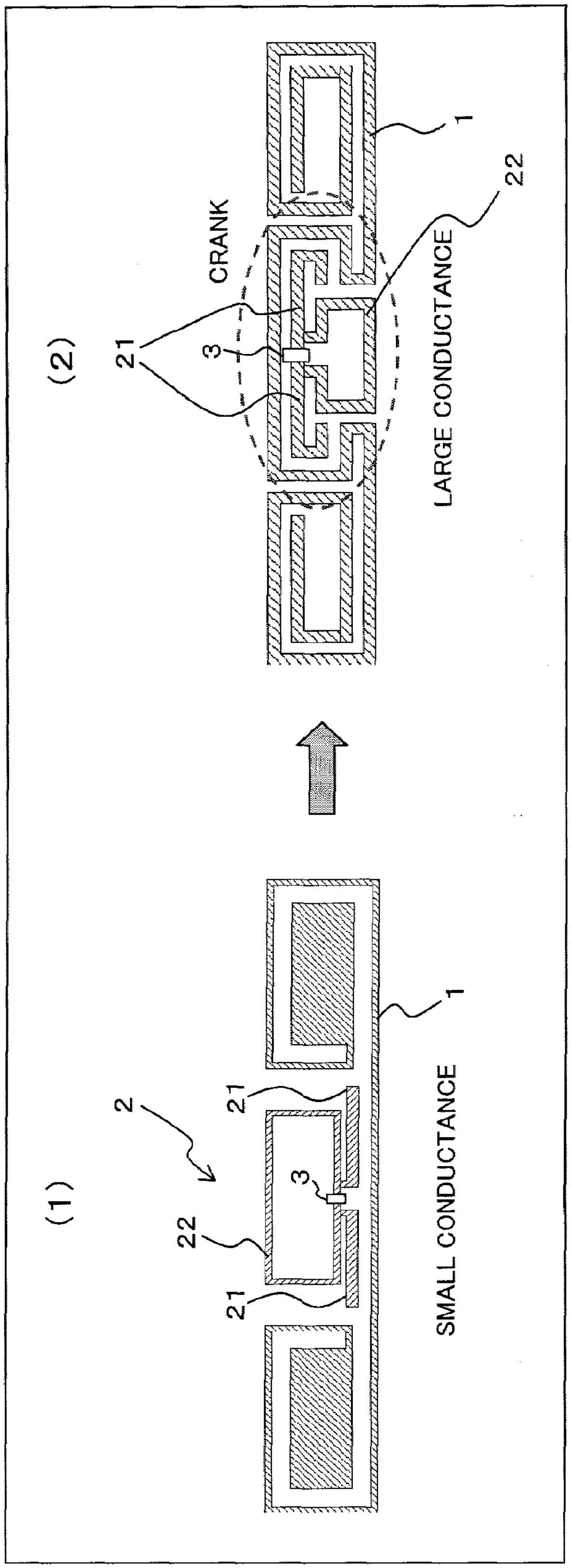
FIG. 2 is a diagram depicting a modification of the wireless tag of FIG. 1.

The conductor pattern of FIG. 1 (the same as one illustrated in item (1) of FIG. 2) may be formed by folding at least part of the antenna pattern 1, and the loop pattern 22 and the dipole sections 21 of the matching pattern 2 into a crank shape, as depicted in, for example, item (2) of FIG. 2.

This can make the electrical length of the portion of electromagnetic-inductive coupling between the antenna pattern 1 and the matching pattern (the mainly the dipole sections 21) long. The conductance can be larger even the size and the resonance frequency are unchanged (see the dotted-line circle). Accordingly, it is possible to handle a tag antenna having a small resistance component.

The shapes of the antenna pattern 1 and the matching pattern (the dipole sections 21 and the loop pattern 22) are, of course, not limited to those illustrated in FIG. 1. As long as the required electrical length of the electromagnetic-inductive coupling portion can be secured for a required conductance, the shapes of the patterns can be appropriately modified.

Figure 4:
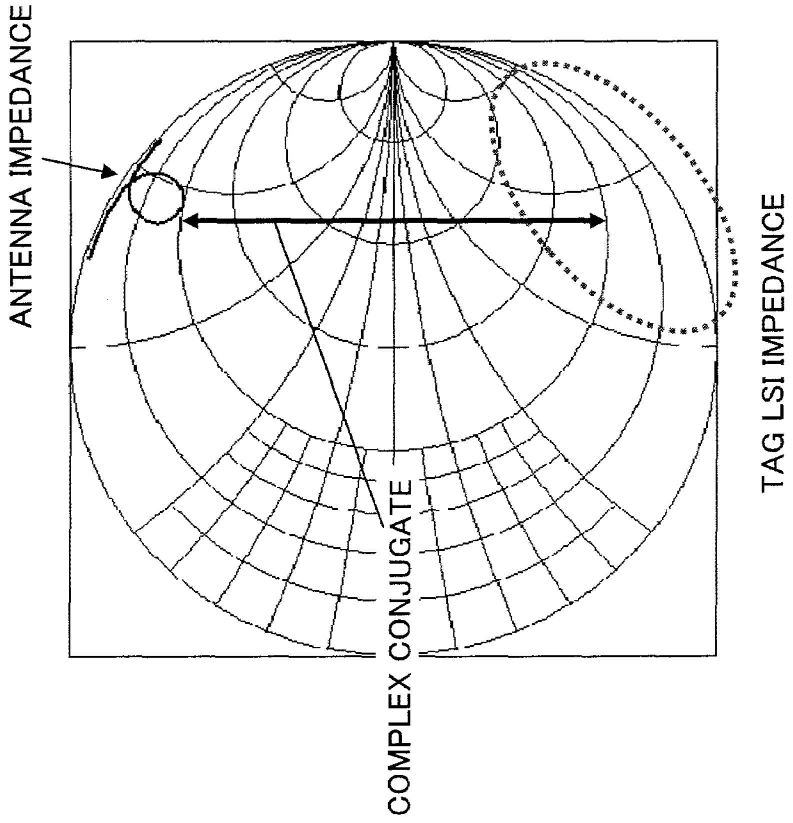
FIG. 4 is a Smith Chart denoting a relationship between an antenna impedance and an integrated-circuit (tag LSI) impedance under the simulation conditions of FIG. 3.
Figure 5:
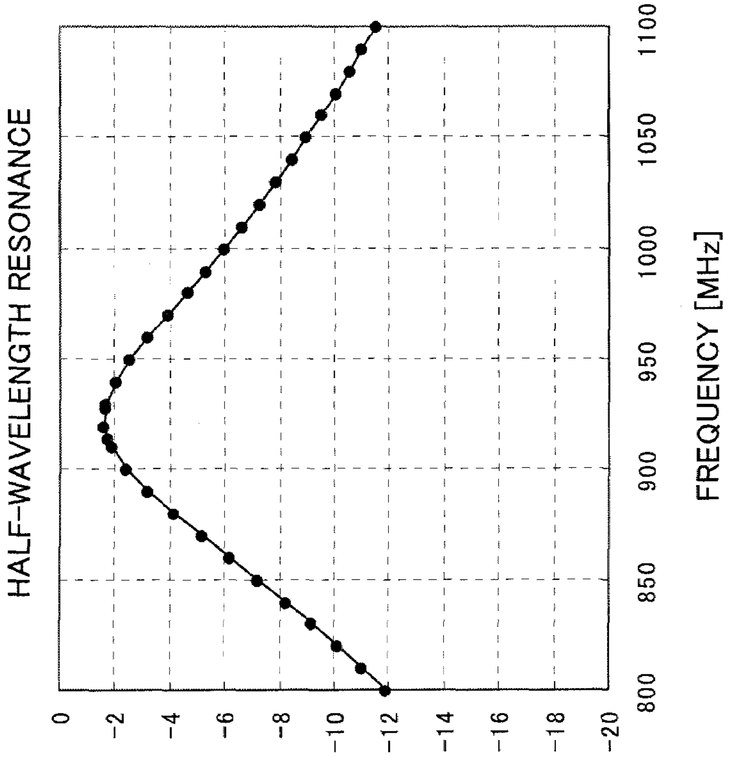
FIG. 5 is a graph denoting the frequency-to-gain characteristics of a wireless tag under the simulation conditions of FIG. 3.
Figure 6:
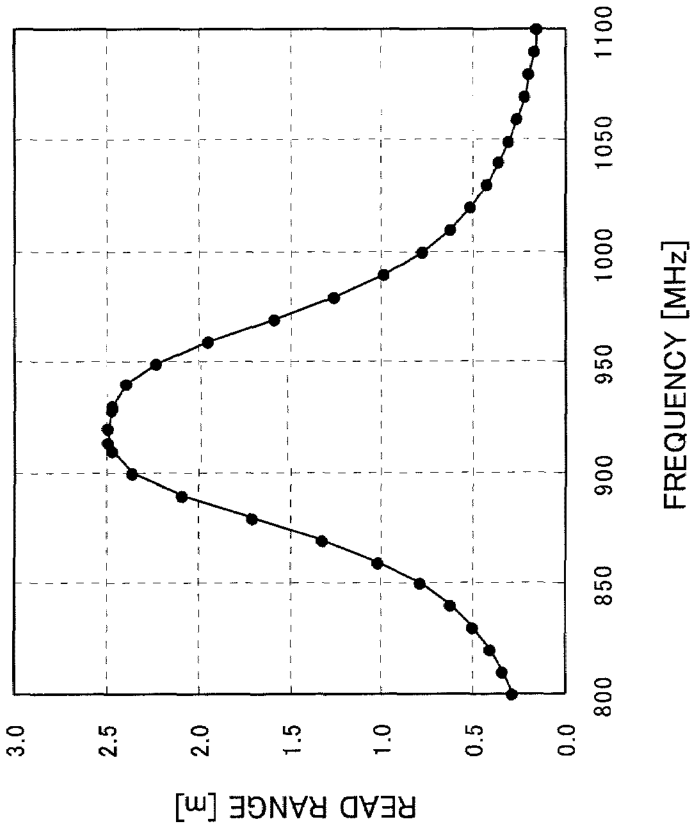
FIG. 6 is a graph denoting the frequency-to-communication-range characteristics of a wireless tag under the simulation conditions of FIG. 3.

The results of simulation performed on the configuration illustrated in item (2) of FIG. 2 are denoted in FIGS. 4 through 6. It should be noted the dimensions of respective patterns are denoted in item (1) of FIG. 3: the width of all the patterns is 1 mm; the electrical conductivity of the patterns is $\sigma 2\times10^{6}$S/m; and the thickness of the patterns is 18 μm. As depicted in item (2) of FIG. 3, the tag has the configuration that the patterns are sandwiched by dielectrics which has a thickness of 0.75 mm (the relative dielectric constant=3.0, dielectric loss tan δ=0.01) and which are affixed one to each side of the patterns. The frequency used is in a frequency range of 800 MHz through 1,100 MHz. For the sake of simplification, a protection (reinforcement) material not depicted. If the reinforcement material has the substantially same electrical characteristics with the dielectric, the reinforcement material a little affects communication characteristics.

When the impedance of the integrated circuit 3 and the impedance (hereinafter simply called "antenna impedance") of the tag antenna have a relationship of complex conjugate, the integrated circuit 3 and the tag antenna are in the state of maintaining impedance matching. Therefore, for example, when the impedance of the LSI 3 is in the range of the dotted-line frame on the Smith Chart as depicted in FIG. 4, the impedance matching can be maintained with the tag LSI 3 having an impedance at least in the range if the antenna impedance can be varied in a range having a relationship of complex conjugate with the range.

As depicted in FIG. 5, the gain of the wireless tag becomes the maximum when the length (electrical length) of the antenna pattern 1 becomes the substantially half wavelength. As a consequence, the tag antenna can attain a practically-sufficient communication range (read range). Further, in using in a higher frequency region (e.g., 952 through 954 MHz in Japan), it is sufficient that the length (electrical length) of the tag antenna is made shorter. Conversely, in using in a lower frequency band (e.g., 869 MHz in Europe), it is sufficient that the length (electrical length) of the tag antenna is made longer.

Here, the communication range (r) of FIG. 6 can be calculated with the use of the following formulae (1) and (2).

$$r = \frac{\lambda}{4\pi}\sqrt{\frac{P_t G_t G_r q}{Pth}} \tag{1}$$

$$q = \frac{4R_c R_a}{|Z_c + Z_a|^2} \tag{2}$$

λ: wavelength
$P_t$: power of reader/writer (RW)
$G_r$: antenna gain
q: matching coefficient
Pth: minimum operation power of the integrated circuit 3

$G_r$: tag antenna gain $R_c$,$X_c$: resistance of the integrated circuit 3 (reactance $Z_c=R_c+jX_c$)

$R_a$,$X_a$: resistance of the tag antenna (reactance $Z_a=R_a+jX_a$)

The calculation conditions of the simulation are denoted in Table 1 below.

| CALCULATION CONDITION | | | |
|---|---|---|---|
| CHIP | MINIMUM OPERATION POWER (Pth) | −9.00 | dBm |
| CIRCUIT | $R_{cp}$ | 800.00 | Ω |
| | $C_{cp}$ | 1.85 | pF |
| R W | POWER ($P_t$) | 27.00 | dBm |
| | GAIN ($G_t$) | 9.00 | dBi |

In Table 1, the symbol $R_{cp}$ represents the conductance component (G) of the admittance ($Y_c=1/Z_c=G+jB$), which is the reciprocal of the impedance $Z_c$ of the integrated circuit 3; and the symbol $C_{cp}$ represents the susceptance component (B) of the admittance ($Y_c$) of the integrated circuit 3.

Hereinafter, description will now be made in relation to methods of adjusting the impedance of the wireless tag.

(Matching Adjustment 1)

Figure 7:
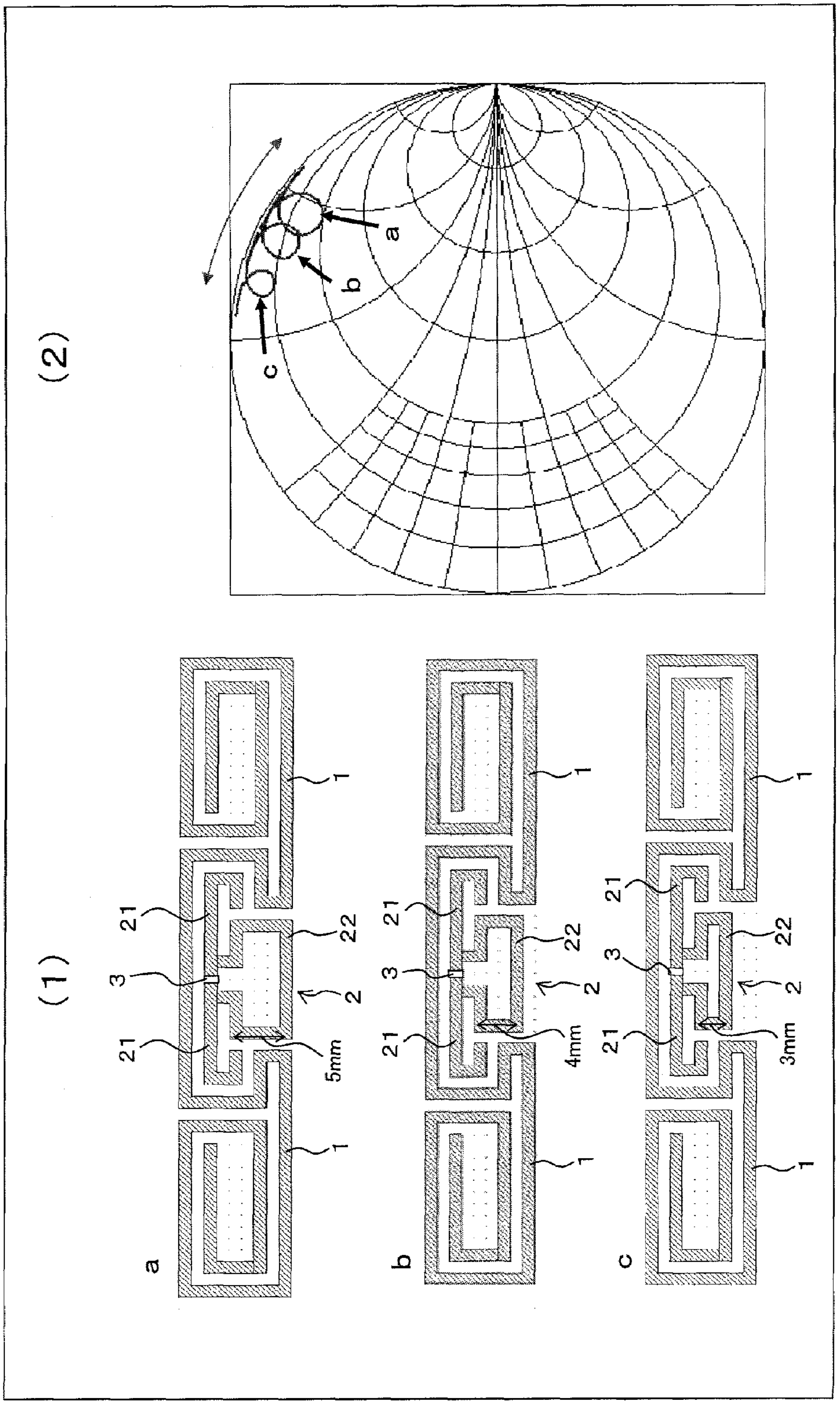
FIG. 7 is a diagram depicting a first method of impedance matching of the wireless tag according to the first embodiment.

As illustrated in a, b, and c in Item (1) of FIG. 7, variation in size (length (electrical length) in the width direction (the top-to-bottom direction of the drawing) of the tag antenna) of the loop pattern 22 of the matching pattern 2 varies the impedance locus on the Smith Chart as depicted in item (2) of FIG. 7.

Specifically, shortening the length of the loop pattern 22 in the width direction counterclockwise rotates (varies) the impedance locus on the Smith Chart. This means increase in absolute value of the susceptance component (B). Accordingly, variation in the length of the loop pattern 22 in the width direction can adjust the input susceptance of the tag antenna.

Along with the counterclockwise rotation of the impedance locus on the Smith Chart, the circles that the impedance locus draws also become smaller. This means decrease in the conductance component (G). Accordingly, shortening the length of the loop pattern 22 in the width length can adjust also the input conductance of the tag antenna. However, the matching adjustment can be accomplished mainly on the basis of one having a larger contribution to the variation between the conductance component and the susceptance component.

(Matching Adjustment 2)

Figure 8:
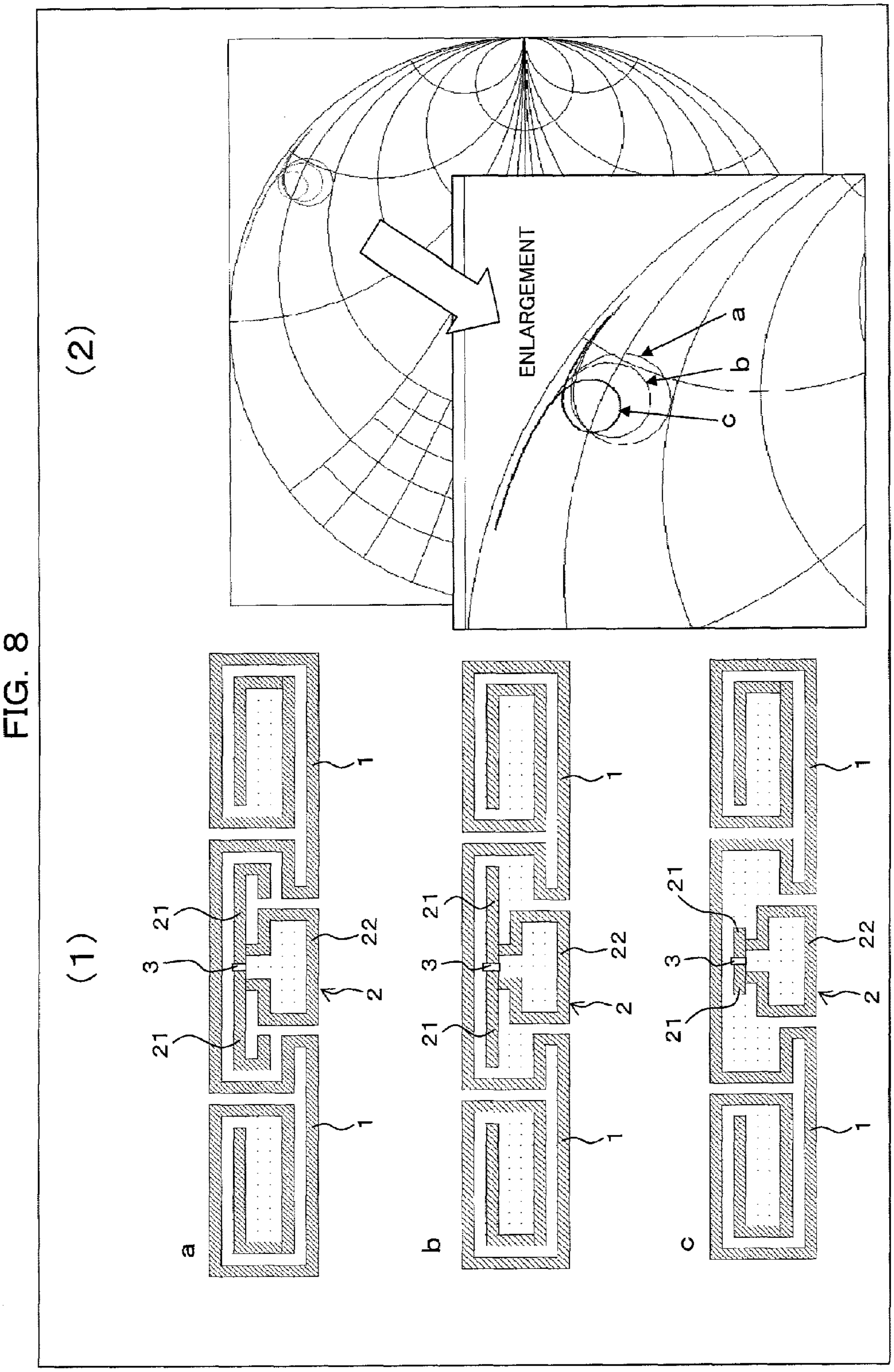
FIG. 8 is a diagram depicting a second method of impedance matching of the wireless tag according to the first embodiment.

As illustrated in a, b, and c in item (1) of FIG. 8, variation in length of the dipole sections (both line patterns) 21 of the matching pattern 2 (i.e., length (electrical length) of a part which is electromagnetic-inductively coupled mainly with the antenna pattern 1) varies the impedance locus on the Smith Chart as depicted in item (2) of FIG. 8.

Specifically, shortening the length (electrical length) of the dipole sections 21 causes the circles that the impedance locus draws on the Smith Chart to be smaller. This means weakening in the degree of coupling of the electromagnetic-inductive coupling between the dipole sections 21 and the antenna pattern 1, which results in the decrease in the conductance component (G).

Accordingly, variation in length (electrical length) of the dipole sections 21 can adjust mainly the input conductance of the tag antenna.

(Matching Adjustment 3)

Figure 9:
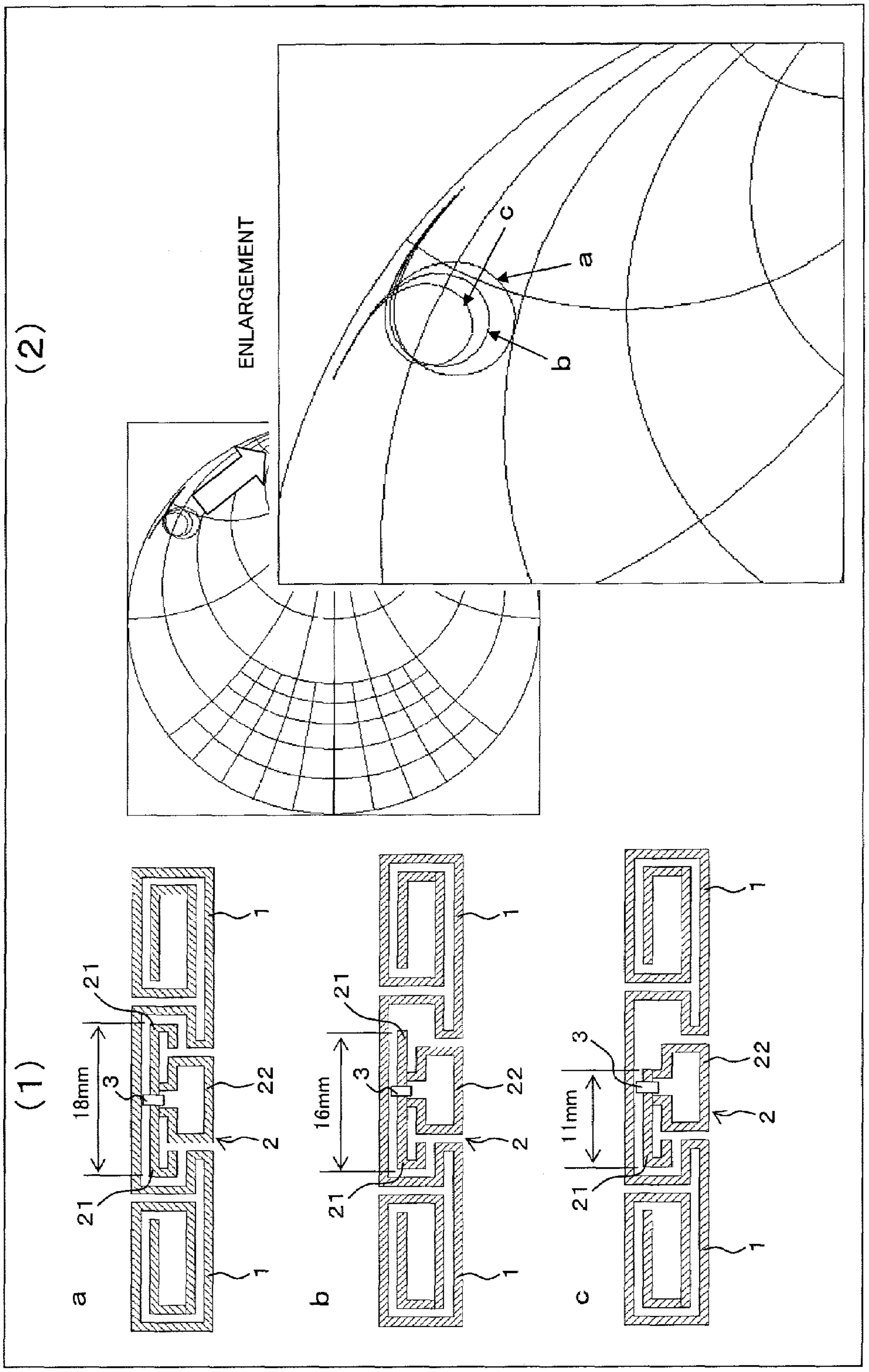
FIG. 9 is a diagram depicting a third method of impedance matching of the wireless tag according to the first embodiment.

As illustrated in a, b, and c in item (1) of FIG. 9, variation in the length (electrical length) of one of the dipole sections 21 of the matching pattern 2 varies the impedance locus on Smith Chart as depicted in item (2) of FIG. 9.

Specifically, shortening the length (electrical length) of one of the dipole sections 21 weakens the degree of coupling of the electromagnetic-inductive coupling between the dipole sections 21 and the antenna pattern 1, so that the circles that the impedance locus draws on the Smith Chart become smaller, which results in decrease in conductance component (G).

Accordingly, variation in length (electrical length) of either one of the dipole sections 21 can adjust mainly the input conductance of the tag antenna.

(Matching Adjustment 4)

Figure 10:
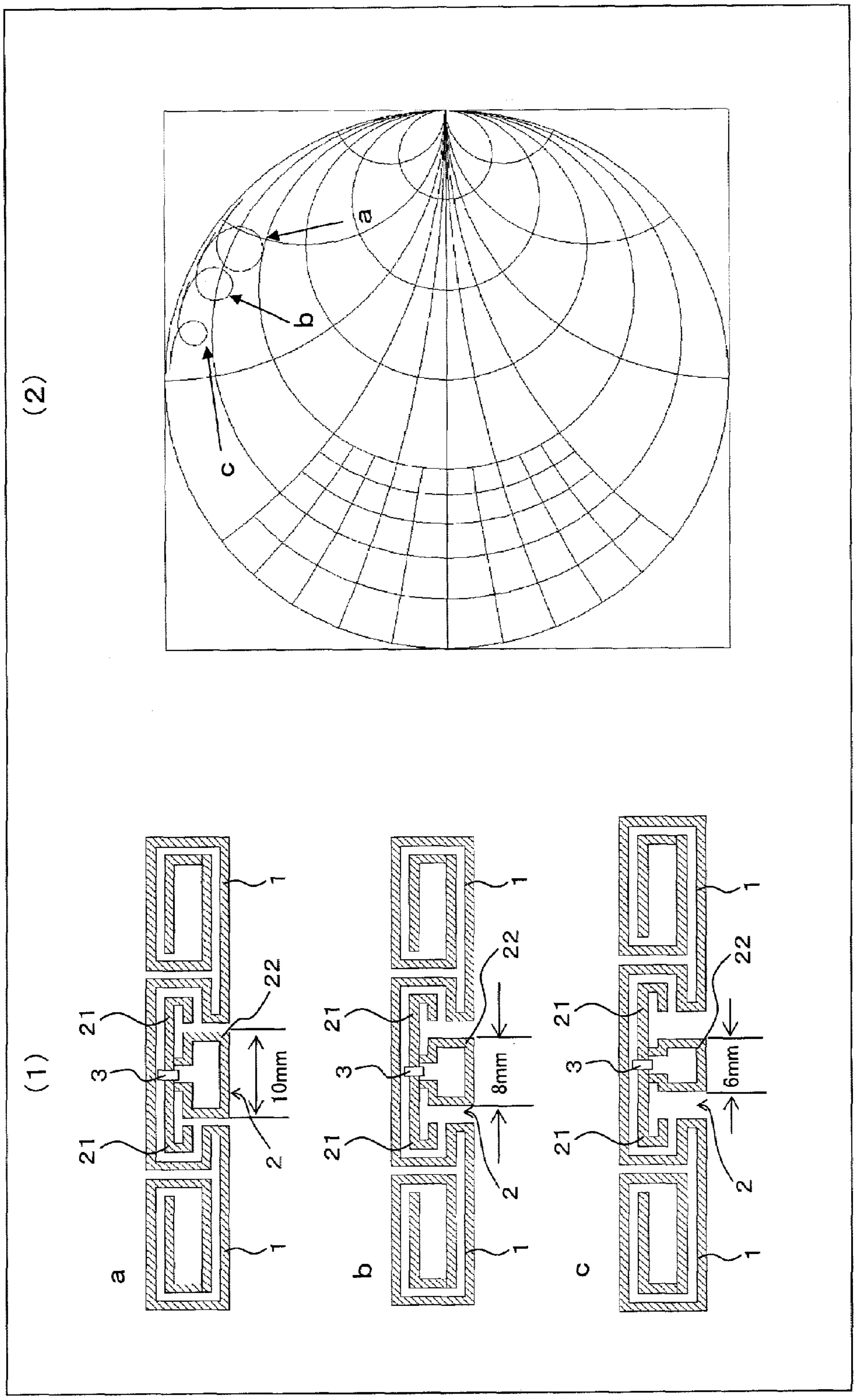
FIG. 10 is a diagram depicting a fourth method of impedance matching of the wireless tag according to the first embodiment.

As illustrated in a, b, and c in item (1) of FIG. 10, variation in size (length (electrical length) in the longitudinal direction (the right-to-left direction of the drawing) of the tag antenna) of the loop pattern 22 of the matching pattern 2 varies the impedance locus on the Smith Chart as depicted in item (2) of FIG. 10.

Specifically, shortening the length of the loop pattern 22 in the longitudinal direction counterclockwise rotates (varies) the impedance locus on the Smith Chart. This means increase in absolute value of the susceptance component (B). Accordingly, variation in the length of the loop pattern 22 in the longitudinal direction can adjust the input susceptance of the tag antenna.

Along with the counterclockwise rotation of the impedance locus on the Smith Chart, the circles that the impedance locus draws also become smaller (i.e., the conductance component becomes smaller) in item (2) of FIG. 10. This means decrease in the conductance component (G). Accordingly, shortening the length of the loop pattern 22 in the longitudinal length can also adjust the input conductance of the tag antenna. However, the matching adjustment can accomplished mainly on the basis of one having a larger contribution to the variation between the conductance component and susceptance component.

(Matching Adjustment 5)

Figure 11:
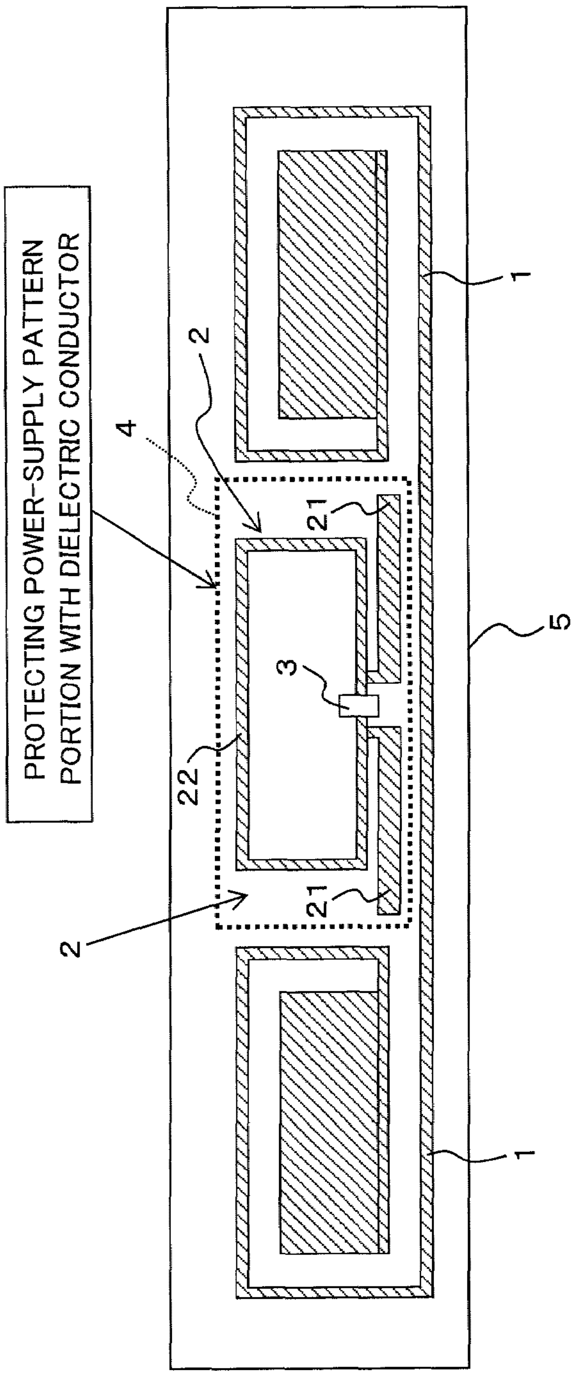
FIG. 11 is a diagram depicting a fifth method of impedance matching of the wireless tag according to the first embodiment.

As depicted in FIG. 11, when the matching pattern 2 (the dipole sections 21 and the loop pattern 22) and the integrated circuit 3 are coated with the dielectric material 4, such as epoxy resin, keeping away from (in avoidance of) the antenna pattern 1, for the sake of protection (reinforcement), the electrical lengths of the dipole sections 21 and the loop pattern 22 are varied in accordance with variation in dielectric constant of the dielectric material (hereinafter also called an "LSI protection material") 4, so that matching adjustment can be accomplished.

For example, increase in dielectric constant of the dielectric material 4 causes the loop pattern 22 to be apparently long, resulting in decrease in absolute value of the susceptance. This causes the dipole sections 21 to be apparently long, resulting in increase in conductance. In FIG. 11, the reference number 5 represents resin material covering the entire tag antenna.

Figure 12:
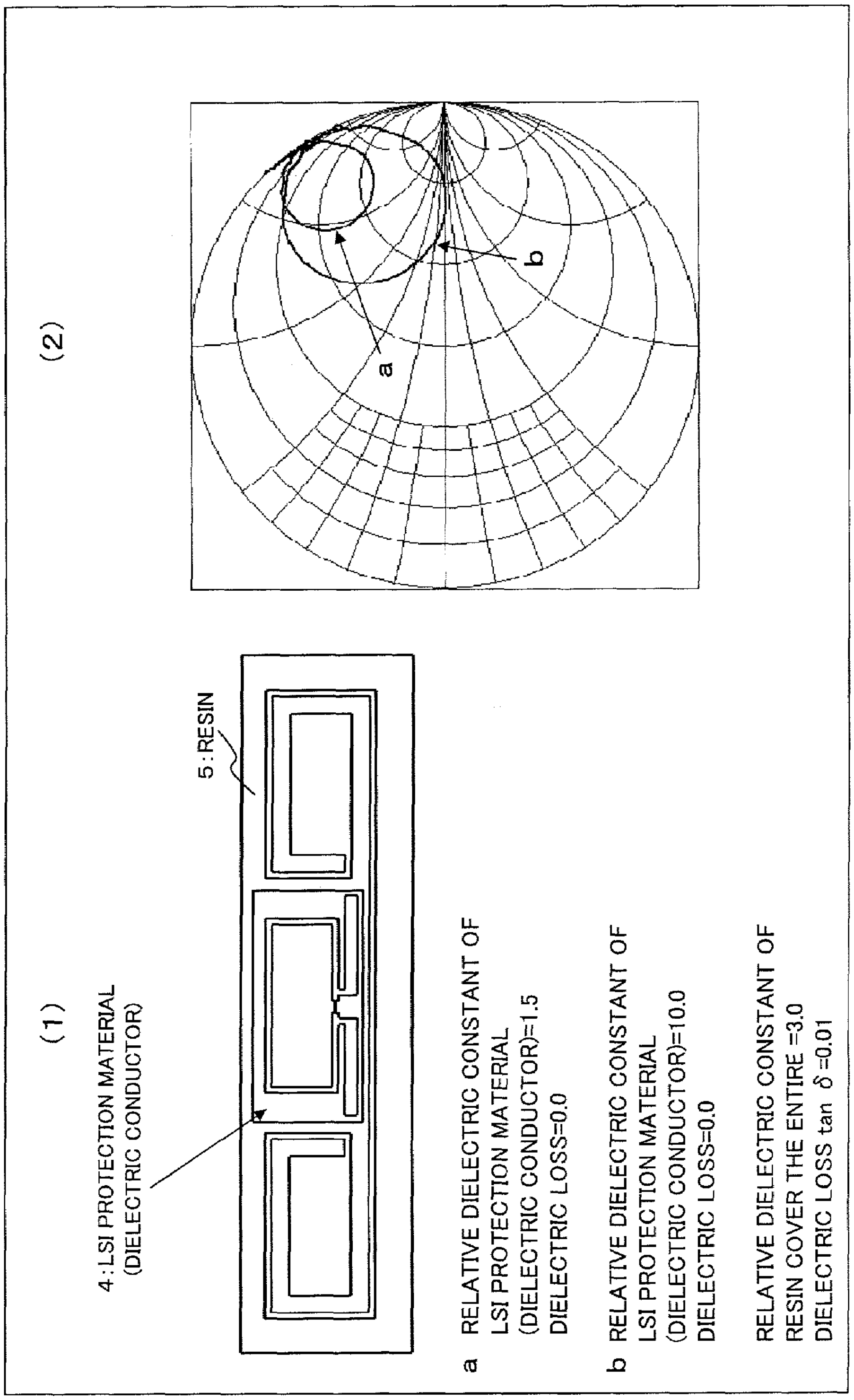
FIG. 12 is a diagram depicting a sixth method of impedance matching of the wireless tag according to the first embodiment.

An example of calculation is denoted in FIG. 12. Item (1) of FIG. 12 denotes results of simulation of cases of: the relative dielectric constant of the dielectric material 4=1.5, dielectric loss tan $\delta$=0.0 (model case a); and the relative dielectric constant of the dielectric material 4=10.0, dielectric loss tan $\delta$=0.0 (model case b). Item (2) of FIG. 12 denotes the variation in impedance on the Smith Chart (the used frequency band=800 MHz through 1,100 MHz). Both model cases a and b assume that the resin material 5 that covers the entire tag antenna has the relative dielectric constant=3.0 and the dielectric loss tan $\delta$=0.01.

From item (2) of FIG. 12, it is understood that increase in dielectric constant of the dielectric material 4 causes the circles that the impedance locus draws on the Smith Chart to become larger. In addition, it is understood that the circles slightly rotate (vary) clockwise. This is because the dipole sections 21 and the loop pattern 22 appear to be long to cause the absolute value of the susceptance component to be small. In addition, the dipole sections 21 appearing to be long enhances the degree of coupling of the electromagnetic-inductive coupling between the power-supply pattern 2 and the antenna pattern 1, and consequently increases the conductance component.

The dielectric constant of the dielectric material 4 may be partially varied. For example, the dielectric constant of a part which covers the dipole sections 21 can be set independently of that of a part which covers the loop pattern 22. Such setting can change the electric length of the dipole sections 21 independently from that of the loop pattern 22, so that the input conductance and the input susceptance of the tag antenna can be adjusted independently from each other.

As described above, the wireless tag of the first embodiment can control (adjust) the resistance component and the reactance component (the conductance component and the susceptance component) independently from each other simply by individually varying the respective sizes of the dipole sections 21 and the loop pattern 22 of the power-supply pattern 2 without requiring modification in the positional relationship (such as the distance) with the antenna pattern 1. Accordingly, it is possible to realize a wireless tag which easily accomplishes impedance matching and which is easily made to be small in size.

In addition, since the antenna pattern 1 is physically separated from the power-supply pattern 2 (the dipole sections 21 and the loop pattern 22), these pattern can be individually designed and produced with ease. The above size modification for impedance matching can be carried out with ease.

Further, since the antenna pattern 1 is physically separated (independent) from the power-supply pattern 2, the power-supply pattern 2 (the dipole sections 21 and the loop pattern 22) and the integrated circuit 3 can be easily protected (reinforced) by coating with dielectric material 4 in avoidance of the antenna pattern 1. Thereby, no portion is generated which the LSI protection material 4 traverse the antenna pattern 1 as the conventional technique generates so that disconnection caused at the portion can be avoided.

(Method of Production)

Next, description will now be made in relation to methods of producing the above tag antenna.

One of the methods is, for example, to form the antenna pattern 1 and the power-supply pattern 2 on one surface of a dielectric material (substrate), such as a resin film made of polyethylene terephthalate (PET) or a printed board, in which method these pattern may be formed in any order or simultaneously. After the formation, the power-supply pattern 2 is covered with a protection (reinforcement) material if required. In addition, the entire tag antenna is covered with a certain resin material if required.

Another method is to form the antenna pattern 1 and the power-supply pattern 2 independently from each other on the different surfaces of a dielectric material (substrate) such as a resin film and a printed board. Specifically, the antenna pattern 1 is formed on one surface of the dielectric material and the power-supply pattern 2 is formed on the other surface.

Figure 13:
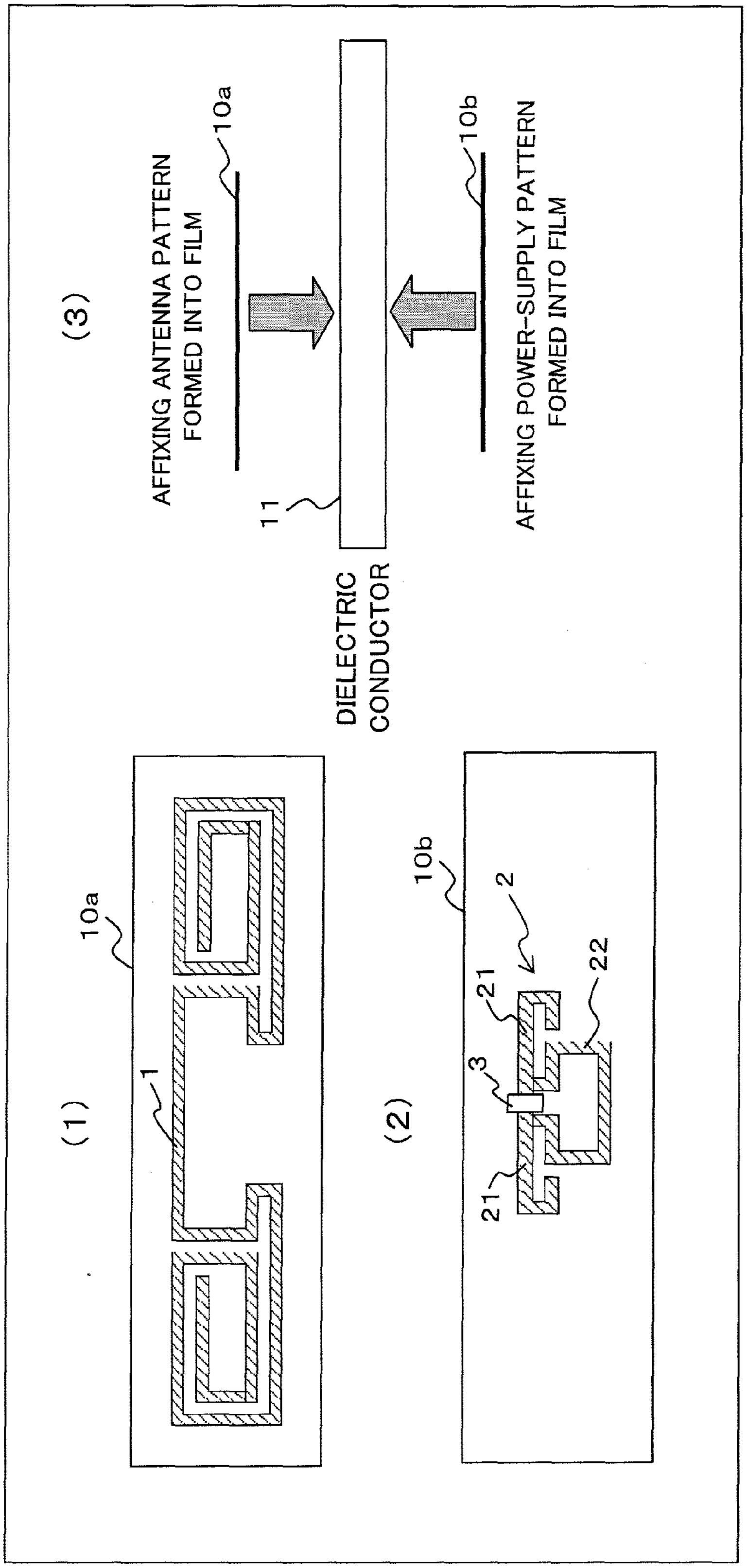
FIG. 13 is a diagram illustrating a method of producing the wireless tag according to the first embodiment.

For example, as depicted in FIG. 13, (1) the antenna pattern 1 is formed on the surface of a first resin film 10*a*; (2) the power-supply pattern 2 is formed on the surface of a second resin film 10*b*; and (3) one of the films 10*a* and 10*b* is affixed to one surface of the dielectric material (substrate) 11 and the other film 10*a* or 10*b* is affixed to the other surface of the dielectric material 11.

After the formation, the power-supply pattern is covered with a protection (reinforcement) material if required. In addition, the entire tag antenna is covered with a certain resin material if required.

With this configuration, in the cases where the matching is desired to be adjusted without varying the resonance frequency of the tag antenna and where the resonance frequency is desired to be adjusted without varying the matching, it is sufficient that either one of the patterns 1 and 2 on the different surfaces are modified, bringing advantages in the aspect of the costs.

Figure 14:
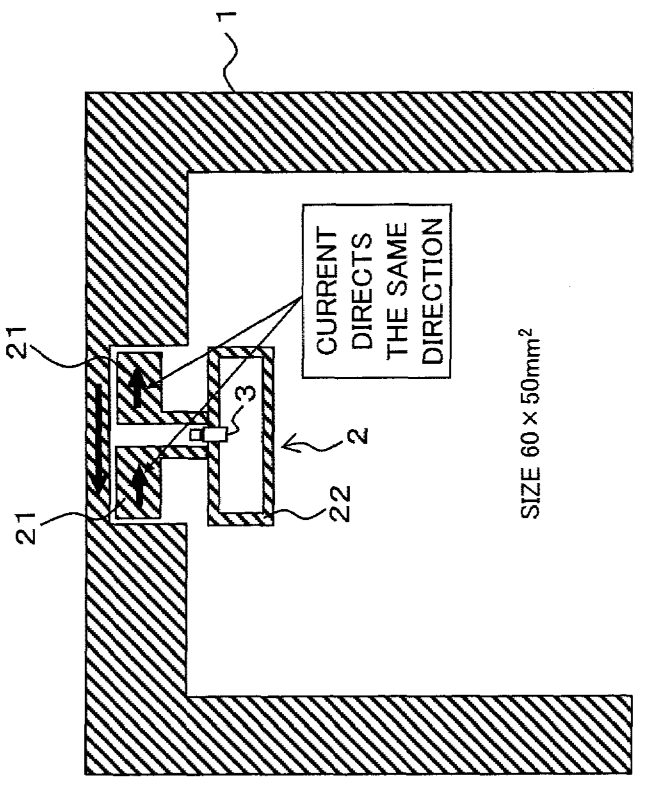
FIG. 14 is a plain view illustrating a modification of the wireless tag of FIGS. 1 and 2.
Figure 15:
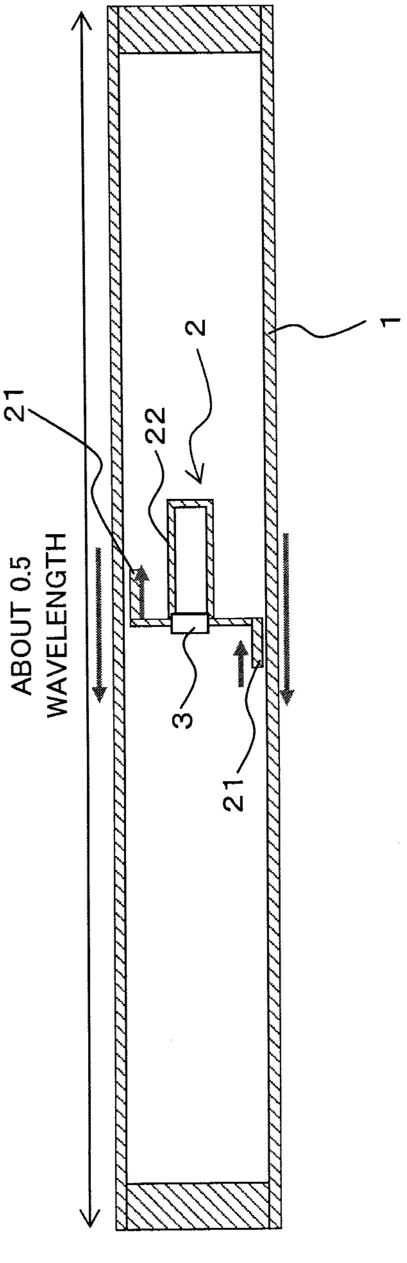
FIG. 15 is a plain view illustrating a modification of the wireless tag of FIGS. 1 and 2.
Figure 16:
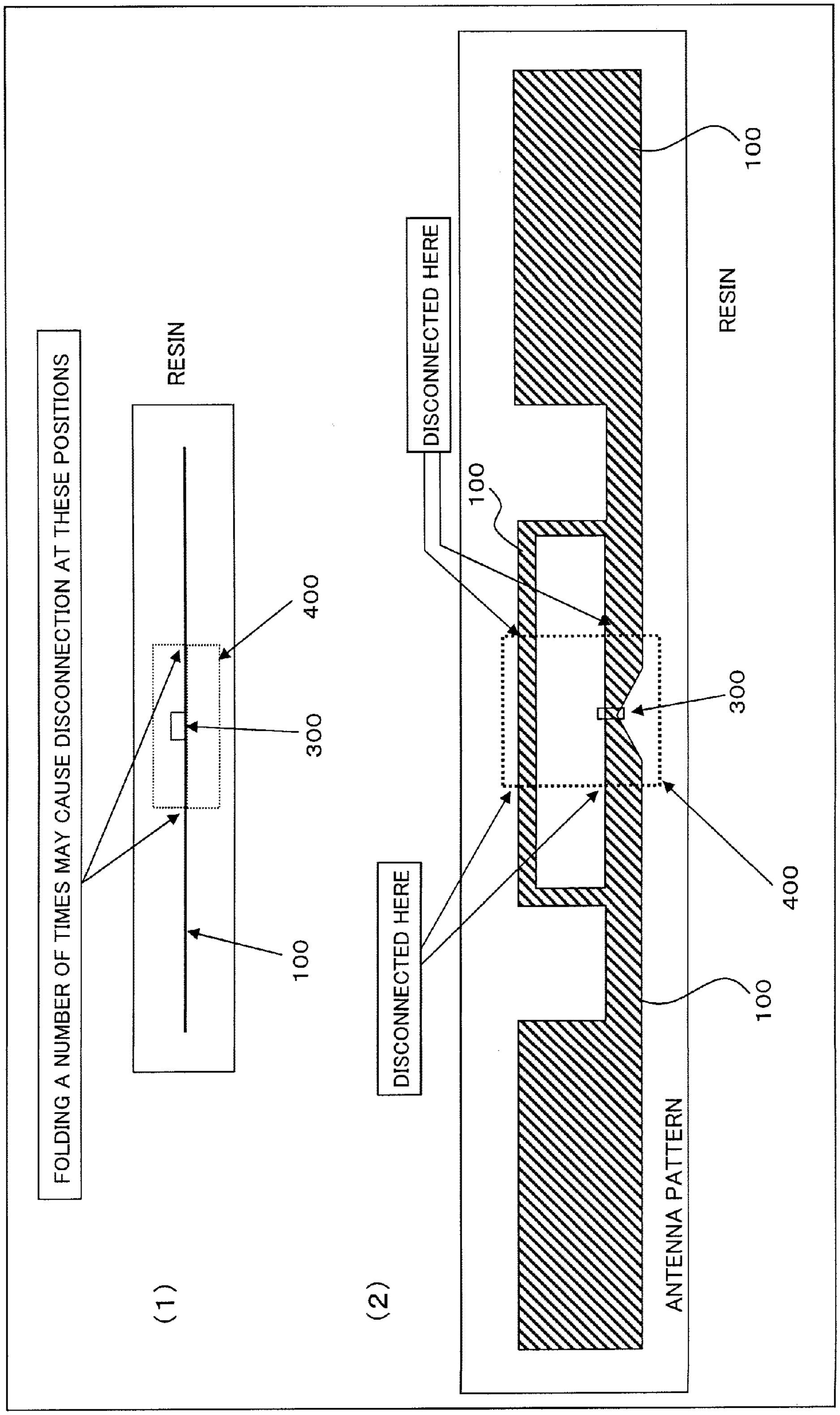
FIG. 16 is a diagram denoting problems of the conventional technique.

(2) Modification:

The conductive pattern of the wireless tag may take the shape of, for example, FIG. 14 or FIG. 15.

The wireless tag of FIG. 14 includes the antenna pattern 1 folded into a C-shape (C-shaped pattern), and disposes a power-supply pattern 2 so that the dipole sections 21 is electromagnetic-inductively coupled with the antenna pattern 1 at a part at which the C-shaped pattern is partially narrowed.

Here, also in this modification, setting the electrical length of the dipole sections 21 to be not more than the half-wavelength can cause current flowing the respective dipole sections 21 to be in the same direction, so that power supply can be enabled. Such an arrangement can realize a wireless tag whose resistance component and reactance component of the impedance can be easily adjusted independently of each other and which has the shape being approximately square (60 mm×50 mm).

Alternatively, the wireless tag illustrated in FIG. 15 adopts a so-called folded dipole antenna as the antenna pattern 1, which is used in combination with the power-supply pattern 2. The power-supply pattern 2 is formed such that the L-shaped dipole sections 21 is electromagnetic-inductively coupled with respective long sides (having a length of the half-wavelength or of substantially half-wavelength) of the antenna pattern 1 opposing to each other.

Through the long sides of the antenna pattern 1 opposing to each other, current need to flow in the same direction. For this purpose, the straight parts of the dipole sections 21 which parts are electromagnetic-inductively coupled with the antenna pattern 1 are preferably formed in opposite directions.

According to the embodiments described above, at least one of the following effects or advantages can be obtained:

(1) The resistance component and the reactance component can be controlled (adjusted) simply by varying the respective sizes of the first power-supply conductor and the second power-supply conductor independently from each other without requiring modification in positional relationship (distance) with the antenna conductor. Therefore, it is possible to realize a wireless tag which easily attains impedance matching and which is easily made to be small in size.

(2) In addition, since the antenna conductor is physically separated from the first power-supply conductor and the second power-supply conductor, these conductors can be individually designed and produced with ease, facilitating the above size modification for impedance matching.

(3) Further, since the antenna conductor is physically separated from the first power-supply conductor and the second power-supply conductor, a protection or reinforcement material can be easily provided in avoidance of the antenna conductor and thereby, disconnection of the antenna conductor can be avoided with ease.

As described above, the embodiments can provide a wireless tag having the capability of independently adjusting (controlling) the resistance component and the reactance component of the impedance with ease and having the easiness of forming into a small size, so that the embodiments are extremely useful in the technique fields of wireless communication and of management on production, inventory, and distribution of articles.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A wireless tag comprising:

an antenna conductor;

a first power-supply conductor which is electromagnetic-inductively coupled with the antenna conductor; and a second power-supply conductor which is loop-shaped and which is electrically coupled with the first power-supply conductor.

2. The wireless tag according to claim 1, wherein the first power-supply conductor has a form of a dipole antenna or a monopole antenna.

3. The wireless tag according to claim 1, wherein the antenna conductor, the first power-supply conductor, and the second power-supply conductor are arranged at a first surface of a dielectric substrate.

4. The wireless tag according to claim 1, wherein the antenna conductor is arranged at a first surface of a dielectric substrate; and the first power-supply conductor and the second power-supply conductor are arranged at a second surface of the dielectric substrate.

5. The wireless tag according to claim 1, further comprising a reinforcement member which covers the first power-supply conductor and the second power-supply conductor in avoidance of the antenna conductor.

6. The wireless tag according to claim 1, wherein the electrical length of a part of the first power-supply conductor which part is electromagnetic-inductively coupled with the antenna conductor is set to be equal to or less than the half of a wavelength of a signal transceived by the antenna conductor.

7. The wireless tag according to claim 1, wherein the electrical length of the second power-supply conductor is shorter than a wavelength of a signal transceived by the antenna conductor.

8. A method for producing a wireless tag, the method comprising:

forming an antenna conductor;

forming a first power-supply conductor which is electromagnetic-inductively coupled with the antenna conductor; and forming a second power-supply conductor which is loop-shaped and which is electrically coupled with the first power-supply conductor.

9. The method according to claim 8, wherein impedance matching between the antenna conductor and an integrated circuit, with which the first power-supply conductor and the second power-supply conductor are electrically coupled, is controlled by varying an electrical length of a part of the first power-supply conductor which part is electromagnetic-inductively coupled with the antenna conductor.

10. The method according to claim 8, wherein impedance matching between the antenna conductor and an integrated circuit, with which the first power-supply conductor and the second power-supply conductor are electrically coupled, is controlled by varying an electrical length of the second power-supply conductor.

* * * * *

UNITED STATES PATENT AND TRADEMARK OFFICE

CERTIFICATE OF CORRECTION

PATENT NO. : 8,493,183 B2
APPLICATION NO. : 12/648675
DATED : July 23, 2013
INVENTOR(S) : Takashi Yamagajo, Toru Maniwa and Manabu Kai It is certified that error appears in the above-identified patent and that said Letters Patent is hereby corrected as shown below:

On the Title Page, Item (12), United States Patent: change “Yamagajp” to --Yamagajo--

On the Title Page, Item (75), Inventors: change “Yamagajp” to --Yamagajo--

Signed and Sealed this
Twenty-third Day of December, 2014

Michelle K. Lee
*Deputy Director of the United States Patent and Trademark Office*